(No Model.)

E. HARDENDORF.
ADJUSTABLE FOLDING BOAT SEAT.

No. 468,873. Patented Feb. 16, 1892.

WITNESSES:
W. S. Huber
C. H. Newell

INVENTOR
Eugene Hardendorf

BY
H. C. Hartman
ATTORNEY

UNITED STATES PATENT OFFICE.

EUGENE HARDENDORF, OF FORT WAYNE, INDIANA.

ADJUSTABLE FOLDING BOAT-SEAT.

SPECIFICATION forming part of Letters Patent No. 468,873, dated February 16, 1892.

Application filed September 30, 1891. Serial No. 407,271. (No model.)

*To all whom it may concern:*

Be it known that I, EUGENE HARDENDORF, a citizen of the United States, residing at the city of Fort Wayne, in the county of Allen, in the State of Indiana, have invented certain new and useful Improvements in Adjustable Folding Boat-Seats; and I do hereby declare that the following is a full, clear, and exact description of the invention, which will enable others skilled in the art to which it appertains to make and use the same, reference being had to the accompanying drawings, which form part of this specification.

My invention relates to improvements in portable seats primarily for use in row-boats and the like; and its objects are to provide a seat with a folding back-rest which can be conveniently carried and readily attached removably to the seat or thwart. I attain these objects by the mechanism illustrated in the accompanying drawings, in which—

Figure 1:
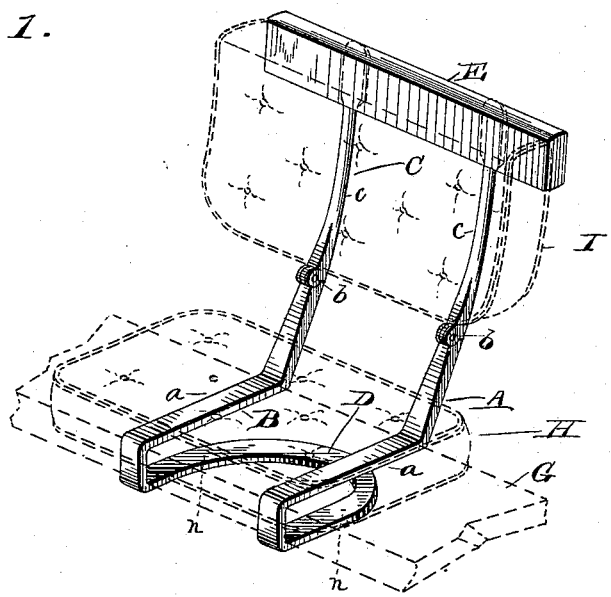
Figure 2:
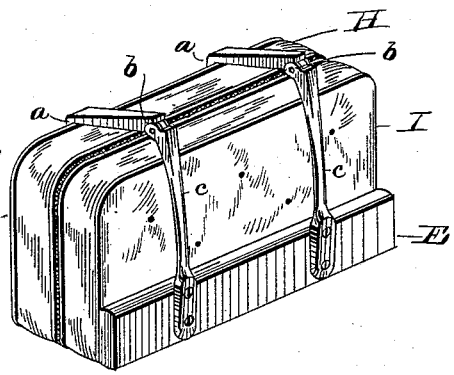

Figure 1 is a perspective view of my device with the cushions shown in dotted lines, and Fig. 2 is a perspective view of my device folded up for carrying.

Similar letters of reference refer to similar parts throughout the several views.

The construction of my device is illustrated in the drawings and is as follows: The two arms A and B are rigidly attached to each other at their upper ends c by the cross-bar E, which forms the back for the seat. To this bar E, I attach a back-cushion I. The parts a and c of the arms A and B are attached to each other at suitable points above the seat by knuckle-joints b, which support and permit the back to be folded down upon the seat. The lower parts a of the arms A and B are bent at suitable angles to the back-rest and extend sufficiently to coincide substantially with the width of the seat-cushion H, and are then bent down over the edge of the board or seat G, and the ends n are extended underneath said seat G and are preferably attached integrally to each other, forming a circular cross-bar D, which holds them in rigid connection and extends not less than one-third the width of the seat underneath it, the space between the extended ends n and the parts a being made sufficiently wide to permit the easy passage of the board or seat G between said parts, and when so in place a cushioned seat H is placed thereon, as shown by the dotted lines in Fig. 1. By this construction the frame is held firmly but removably on the seat or thwart and the back-rest E is firmly braced when occupied by the user.

When not in use or it is desired to carry the seat with you, the back-rest is turned down upon the seat, and the frame, with both cushions, is removed therefrom, the frame holding the whole together in compact and convenient mass for carrying, as illustrated in Fig. 2.

My invention is intended for use principally upon row and other boats which are unprovided with cushioned seats or back-rests. The space between the parts n and a is adapted to receive the width of any such seats, and if in some cases such space is a little wider than necessary the angle at which the back-rest is held is not materially affected thereby. My seats are also preferably made for single persons—that is, for one person—as the folded seat is then in very convenient form and size for carrying under the arm of the user. It is obvious that for single seats only one knuckle-joint need be used, the two arms being combined in one at the points of such junction; but I prefer the two arms with two joints, as shown in the drawings.

Having thus described my invention, what I claim as new, and desire to secure by Letters Patent, is—

As an article of manufacture, an adjustable folding boat-seat consisting of the arms A and B, joined at their upper ends by the cross-bar E, adapted to form with a cushion attached the back-rest of the seat, knuckle-joints b, connecting the two parts a and c of said arms, and the lower ends n, joined together integrally, so as to form the cross-bar D, and extending underneath the seat parts a distance not less than one-third thereof and provided with cushions for the seat and back-rest, substantially as described.

In testimony whereof I hereunto subscribe my name, in the presence of two witnesses, this 26th day of September, 1891.

EUGENE HARDENDORF.

Witnesses:
H. C. HARTMAN,
J. A. SHOAFF.